(12) United States Patent  
Eicher

(10) Patent No.: US 6,390,496 B1  
(45) Date of Patent: May 21, 2002

(54) ADAPTER APPARATUS FOR ASSISTING TRANSPORTATION OF A WHEEL BARROW

(76) Inventor: Todd R Eicher, W6192 Tucker Rd., Monticello, WI (US) 53570

( * ) Notice: Subject to any disclaimer, the term of this patent is extended or adjusted under 35 U.S.C. 154(b) by 0 days.

(21) Appl. No.: 09/982,066

(22) Filed: Oct. 17, 2001

Related U.S. Application Data

(60) Provisional application No. 60/302,634, filed on Jul. 2, 2001.

(51) Int. Cl.⁷ .................................................. B62B 3/02
(52) U.S. Cl. .................. 280/653; 280/47.2; 280/47.31; 414/469
(58) Field of Search .................. 414/354, 469; 280/653, 652, 654, 47.2, 47.3, 47.31, 47.315, 47.32, 47.33

(56) References Cited

U.S. PATENT DOCUMENTS

| | | | | |
|---|---|---|---|---|
| 2,973,224 A | * | 2/1961 | Wall, Sr. .................. | 280/47.31 |
| 4,270,786 A | * | 6/1981 | Mattox ..................... | 280/47.32 |
| 4,767,128 A | * | 8/1988 | Terhune .................... | 280/47.2 |
| 4,789,171 A | * | 12/1988 | Porter ..................... | 280/47.26 |
| 5,031,926 A | * | 7/1991 | Wannamaker ............. | 280/47.2 |
| 6,193,319 B1 | * | 2/2001 | Kielinski ................. | 280/47.31 |

\* cited by examiner

Primary Examiner—Michael Mar  
(74) Attorney, Agent, or Firm—David J. Archer

(57) ABSTRACT

In a wheel barrow having a load carrying container disposed between a rotatable wheel and a handle, an adapter apparatus is disclosed for assisting transportation of the wheelbarrow. The adapter apparatus includes a frame having a first and a second end and an axle having a first and a second side. The axle extends through the frame and the rotatable wheel such that the rotatable wheel rotates about the axle. Additionally, the axle pivotally supports the wheel barrow such that pivotal movement of the wheel barrow about the axle and relative to the frame is permitted. A rotatable device is secured to the frame so that the container is disposed between the axle and the rotatable device. The arrangement is such that in a first mode of operation of the apparatus, the wheel barrow is supported by the frame and is transported on the rotatable wheel and the rotatable device for transportation of the load disposed within the container. In a second mode of operation of the apparatus, the handle of the wheel barrow is lifted relative to the frame such that the wheel barrow is pivoted about the axle for unloading the load from the container.

7 Claims, 6 Drawing Sheets

ADAPTER APPARATUS FOR ASSISTING TRANSPORTATION OF A WHEEL BARROW

This application is a Complete application based on Provisional application 60/302,634 filed Jul. 2, 2001. All of the subject matter of the aforementioned Provisional application is incorporated herein by reference.

BACKGROUND OF THE INVENTION

Field of the Invention

The present invention relates to an adapter apparatus for assisting transportation of a wheel barrow.

More specifically, the present invention relates to an adapter apparatus which includes a frame for supporting a wheel barrow for assisting transportation of a wheel barrow.

BACKGROUND INFORMATION

A typical wheel barrow includes a pair of handles which terminate at an axle for rotatably supporting a wheel. A load carrying container is secured to the handles between the axle and the hand grips of the handles so that when the hand grips are lifted, transportation of the load is permitted, the wheel being the fulcrum point for assisting lifting of the load.

However, many users of the aforementioned conventional wheel barrow have suffered from back injuries as a result of trying to both lift and balance the load during transportation thereof. More particularly, although the wheel barrow concept is excellent for enabling a user to lift a considerable load due to the leverage effect about the fulcrum, problems have been experienced once the load has been lifted as there is a tendency for the weight of the load to tip the wheel barrow sideways during transportation. Such sideways tipping can be counteracted by the user through application of steadying forces through the hand grips. However, the application of such steadying forces puts tremendous strain on the user's spinal column particularly if the weight of the load is great such as in the transportation of concrete or soil.

The present invention overcomes the aforementioned problem by the provision of an adapter apparatus which is easily added to the conventional wheel barrow as a retrofit. The adapter supports the wheel barrow so that the wheel barrow can be moved on a combination of the rotatable front wheel and a pair of casters disposed between the wheel and the hand grips.

Therefore, it is a primary feature of the present invention to provide an adapter apparatus that overcomes the problems associated with the prior art arrangements.

Another feature of the present invention is the provision of an adapter apparatus that facilitates transportation of loads by a conventional wheel barrow.

A further feature of the present invention is the provision of an adapter apparatus that is of relatively low cost.

Another feature of the present invention is the provision of an adapter apparatus that permits transportation of a conventional wheel barrow by towing the same behind a lawn tractor.

Other features and advantages of the present invention will be readily apparent to those skilled in the art by a consideration of the detailed description of a preferred embodiment of the present invention contained herein.

SUMMARY OF THE INVENTION

In a wheel barrow having a load carrying container disposed between a rotatable wheel and a handle, the present invention relates to an adapter apparatus for assisting transportation of the wheel barrow. The adapter apparatus includes a frame having a first and a second end and an axle having a first and a second side. The axle extends through the frame and the rotatable wheel such that the rotatable wheel rotates about the axle. Additionally, the axle pivotally supports the wheel barrow such that pivotal movement of the wheel barrow about the axle and relative to the frame is permitted. A rotatable device is secured to the frame so that the container is disposed between the axle and the rotatable device. The arrangement is such that in a first mode of operation of the apparatus, the wheel barrow is supported by the frame and is transported on the rotatable wheel and the rotatable device for transportation of the load disposed within the container. In a second mode of operation of the apparatus, the handle of the wheel barrow is lifted relative to the frame such that the wheel barrow is pivoted about the axle for unloading the load from the container.

In a more specific embodiment of the present invention, the frame includes a first member having a first and a second extremity and a second member having a first and a second termination. The members are disposed angularly relative to each other so that support of the wheel barrow between the members is permitted.

Also, the first extremity of the first member is pivotally supported about the first side of the axle and the first termination of the second member is pivotally supported about the second side of the axle.

Furthermore, the frame further includes a transverse casing having a first and a second edge, the casing extending between the first and the second members.

Moreover, the first edge of the transverse casing is secured to the second extremity of the first member and the second edge of the transverse casing is secured to the second termination of the second member.

Additionally, the rotatable device includes a first caster secured to the frame and disposed remote from the rotatable wheel and a second caster secured to the frame and disposed remote from the rotatable wheel. The arrangement is such that the frame is disposed between the casters.

Also, a caster support extends through and is rotatably supported by the transverse casing, the caster support having a first and a second end so that the first end of the caster support supports the first caster and the second end of the caster support supports the second caster.

The first end of the caster support includes a first rotatable coupling for coupling the first caster to the caster support and the second end of the caster support includes a second rotatable coupling for coupling the second caster to the caster support.

More specifically, a height adjusting device is secured to the frame for adjusting the casters relative to the frame so that in a first disposition of the height adjusting device, the container is supported for transportation thereof. However, when the height adjusting device is disposed in a second disposition thereof, the container is lowered so that transportation thereof is inhibited.

More particularly, the height adjusting device includes a lever having a proximal and a distal end, the proximal end being pivotally connected to the frame. A link has a first and a second extremity, the first extremity of the link being pivotally secured to the lever between the proximal and distal end thereof. Moreover, an arm is rigidly secured to the caster support, the second extremity of the link being pivotally secured to the arm such that when the lever is disposed in a first location thereof, the link pivots the arm so that the caster support rotates for moving the casters to a raised disposition thereof. When the lever is disposed in a second location thereof, the link pivots the arm so that the caster support rotates for moving the casters to a lowered disposition thereof.

Additionally, a tongue is secured to the frame so that towing of the apparatus and the wheel barrow is permitted.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

Included in such modifications would be the provision of an inverted U-shaped member for slipping over the hand grips of the handle so that the handle can be grasped higher up relative to the frame to further assist in pushing the wheel barrow and adapter apparatus for transportation of a load.

Also included in such modifications would be the provision of a purpose built wheel barrow incorporating the tipping and towing capability of the present invention so that the apparatus is not provided as a retrofit to a conventional wheel barrow.

BRIEF DESCRIPTION OF THE DRAWINGS

Similar reference characters refer to similar parts throughout the various views of the present invention.

DETAILED DESCRIPTION OF THE DRAWINGS

Figure 1:
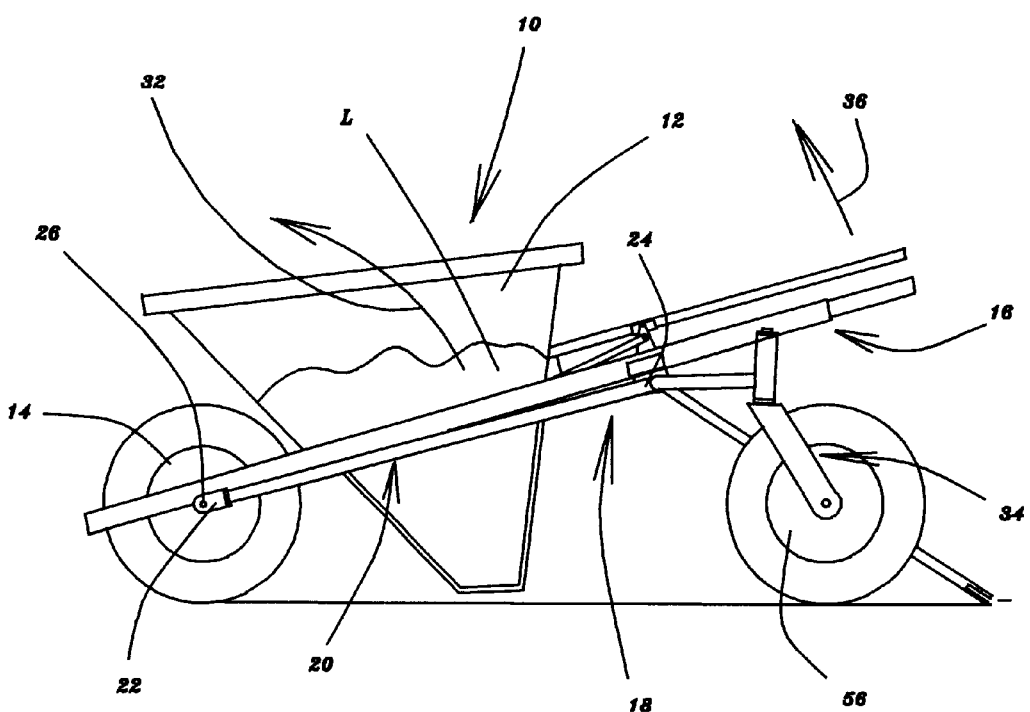
FIG. 1 is a side elevational view of a wheel barrow and adapter apparatus according to the present invention.

FIG. 1 is a side elevational view of a wheel barrow generally designated 10 having a load carrying container 12 disposed between a rotatable wheel 14 and a handle generally designated 16. The present invention relates to an adapter apparatus generally designated 18 according to the present invention for assisting transportation of the wheelbarrow 10. The adapter apparatus 18 includes a frame generally designated 20 having a first and a second end 22 and 24 respectively and an axle 26 having a first and a second side 28 and 30 respectively to be described later with reference to FIG. 2. The axle 26 extends through the frame 20 and the rotatable wheel 14 such that the rotatable wheel 14 rotates about the axle 26. Additionally, the axle 26 pivotally supports the wheel barrow 10 such that pivotal movement of the wheel barrow 10 as indicated by the arrow 32 about the axle 26 and relative to the frame 20 is permitted. A rotatable device generally designated 34 is secured to the frame 20 so that the container 12 is disposed between the axle 26 and the rotatable device 34. The arrangement is such that in a first mode of operation of the apparatus 18, the wheel barrow 10 is supported by the frame 20 and is transported on the rotatable wheel 14 and the rotatable device 34 for transportation of a load L disposed within the container 12. In a second mode of operation of the apparatus 18, the handle 16 of the wheel barrow 10 is lifted as indicated by the arrow 36 relative to the frame 20 such that the wheel barrow 10 is pivoted about the axle 26 for unloading the load L from the container 12.

Figure 2:
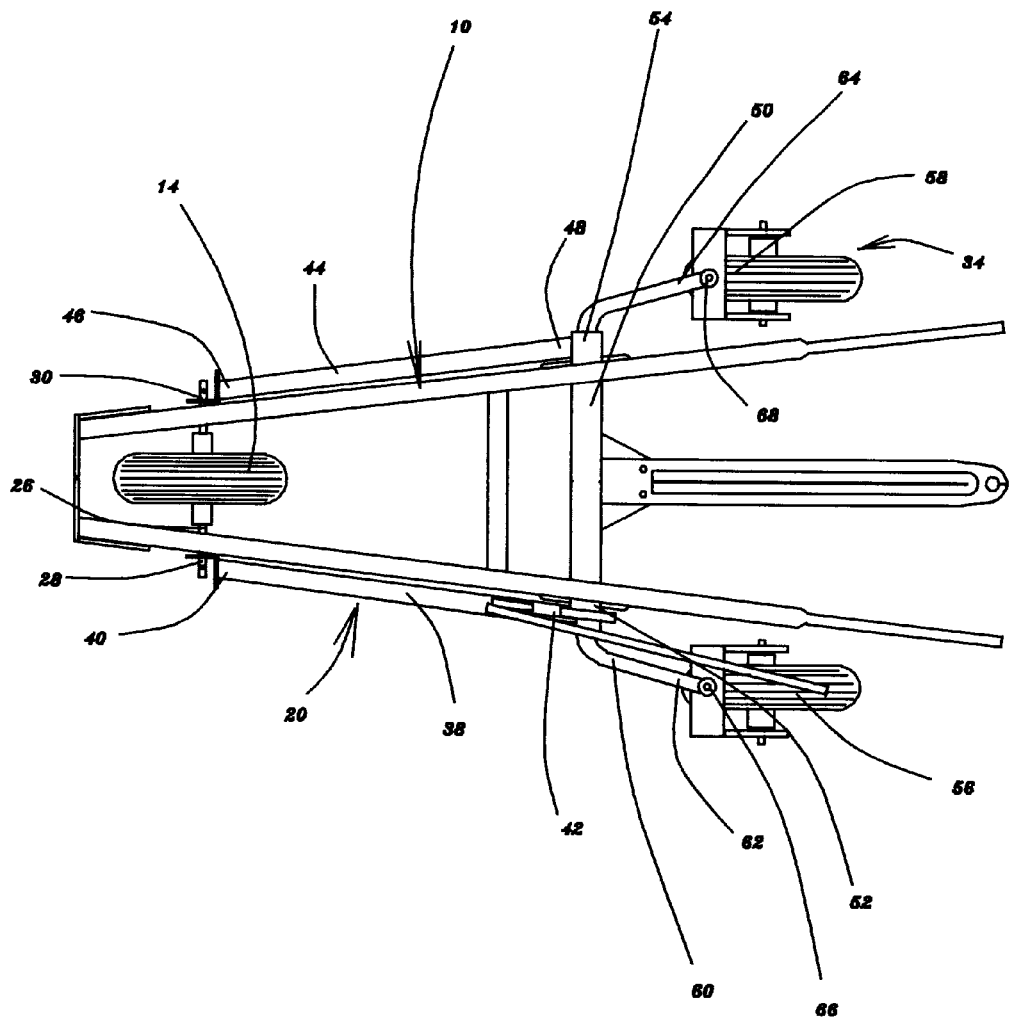
FIG. 2 is a top plan view of the wheel barrow and adapter shown in FIG. 1.

FIG. 2 is a top plan view of the wheel barrow 10 and adapter 18 shown in FIG. 1. As shown in FIG. 2, the frame 20 includes a first member 38 having a first and a second extremity 40 and 42 respectively. The frame 20 also includes a second member 44 having a first and a second termination 46 and 48 respectively. The members 38 and 44 are disposed angularly relative to each other so that support of the wheel barrow 10 between the members 38 and 44 is permitted.

Also, the first extremity 40 of the first member 38 is pivotally supported about the first side 28 of the axle 26 and the first termination 46 of the second member 44 is pivotally supported about the second side 30 of the axle 26.

Furthermore, the frame 20 further includes a transverse casing 50 having a first and a second edge 52 and 54 respectively, the casing 50 extending between the first and the second members 38 and 44.

Moreover, the first edge 52 of the transverse casing 50 is secured to the second extremity 42 of the first member 38 and the second edge 54 of the transverse casing 50 is secured to the second termination 48 of the second member 44.

Additionally, the rotatable device 34 includes a first caster 56 secured to the frame 20 and disposed remote from the rotatable wheel 14. A second caster 58 is secured to the frame 20 and is disposed remote from the rotatable wheel 14. The arrangement is such that the frame 20 is disposed between the casters 56 and 58 respectively.

Also, a caster support 60 extends through and is rotatably supported by the transverse casing 50, the caster support 60 having a first and a second end 62 and 64 respectively so that the first end 62 of the caster support 60 supports the first caster 56 and the second end 64 of the caster support 60 supports the second caster 58.

The first end 62 of the caster support 60 includes a first rotatable coupling 66 for coupling the first caster 56 to the caster support 60 and a second rotatable coupling 68 for coupling the second caster 58 to the second end 64 of the caster support 60.

Figure 3:
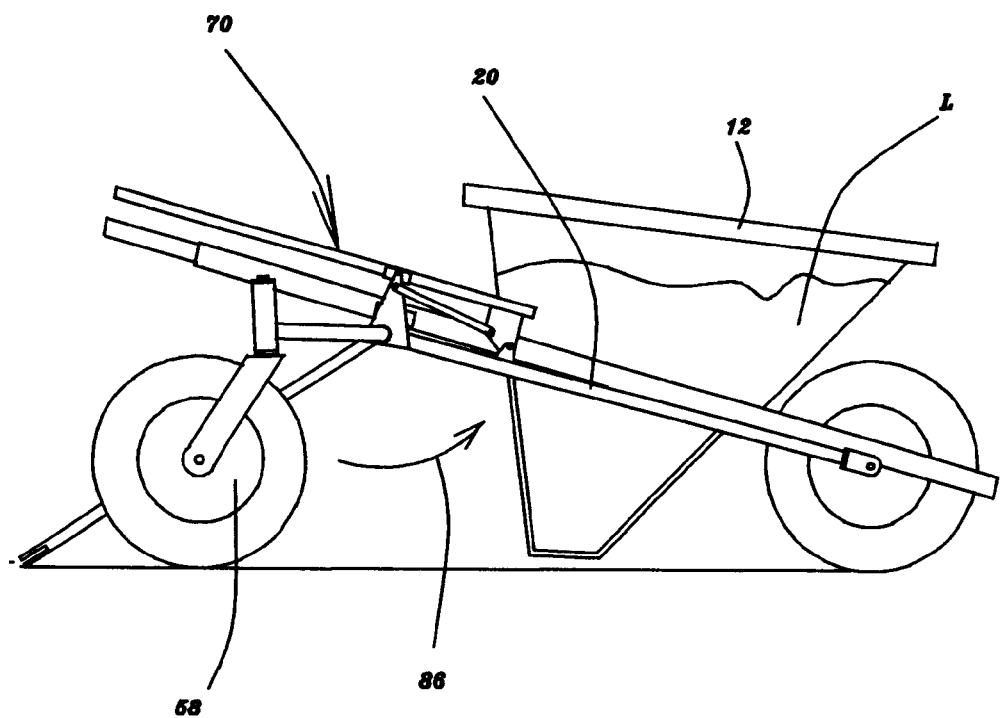
FIG. 3 is a similar view to that shown in FIG. 1 but viewed from the opposite side of the adapter apparatus.

FIG. 3 is a similar view to that shown in FIG. 1 but viewed from the opposite side of the apparatus 18. As shown in FIG. 3, a height adjusting device generally designated 70 is secured to the frame 20 for adjusting the casters 56 and 58 respectively relative to the frame 20 so that in a first disposition of the height adjusting device 70 as shown in FIG. 3, the container 12 is supported for transportation thereof.

Figure 4:
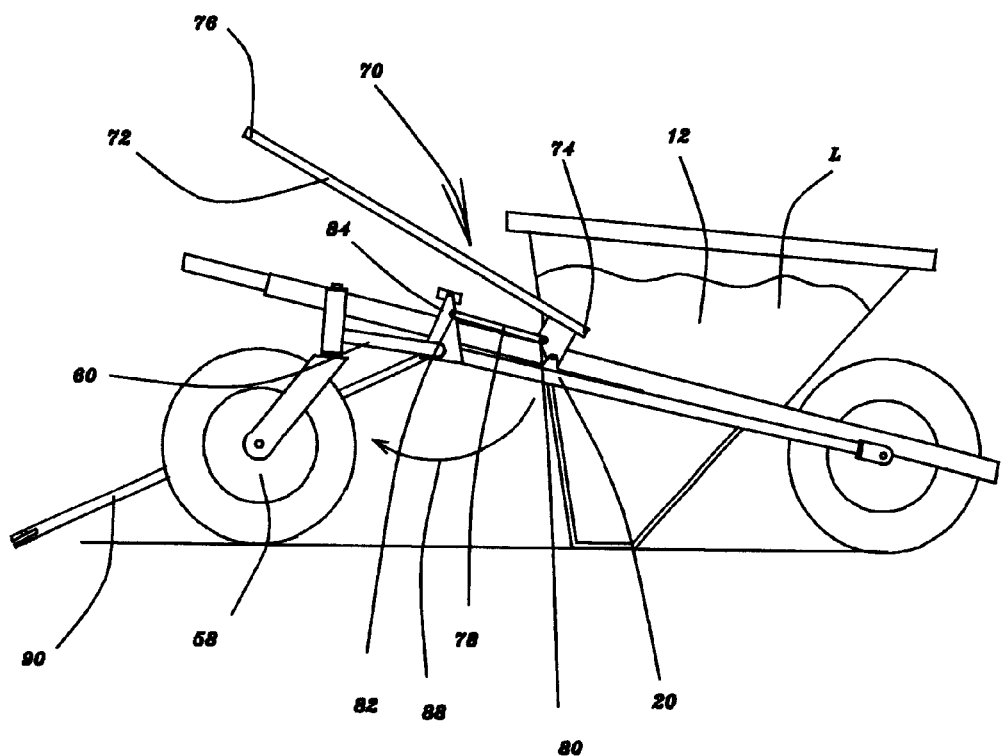
FIG. 4 is a similar view to that shown in FIG. 3 but shows the height adjusting device in a second disposition thereof.

FIG. 4 is a similar view to that shown in FIG. 3 but shows the height adjusting device 70 in a second disposition thereof. As shown in FIG. 4, when the height adjusting device 70 is disposed in a second disposition thereof, the container 12 is lowered so that transportation thereof is inhibited.

More particularly, the height adjusting device 70 includes a lever 72 having a proximal and a distal end 74 and 76 respectively. The proximal end 74 is pivotally connected to the frame 20. A link 78 has a first and a second extremity 80 and 82 respectively, the first extremity 80 of the link 78 being pivotally secured to the lever 72 between the proximal and distal end 74 and 76 respectively thereof. Moreover, an arm 84 is rigidly secured to the caster support 60, the second extremity 82 of the link 78 being pivotally secured to the arm 84 such that when the lever 72 is disposed in a first location thereof, as shown in FIG. 3, the link 78 pivots the arm 84 so that the caster support 60 rotates as indicated by the arrow 86 for moving the casters 56 and 58 to a lowered disposition thereof. When the lever 72 is disposed in a second location thereof, as shown in FIG. 4, the link 78 pivots the arm 84 as indicated by the arrow 88 so that the caster support 60 rotates for moving the casters 56 and 58 to a raised disposition thereof.

Additionally, a tongue 90 is secured to the frame 20 so that towing of the apparatus 18 and the wheel barrow 10 supported thereon is permitted.

In operation of the adapter apparatus according to the present invention, the conventional wheel barrow 10 is adjusted by the removal therefrom of the conventional axle (not shown) for supporting the wheel 14. The conventional axle is replaced by the axle 26 which is longer than a conventional axle. The axle 26 extends through the first extremity 40 of the first member 38, through the rotatable wheel 14 and then through the first termination 46 of the second member 44 as shown in FIG. 2. The axle 26 is then secured in place by means of split pins, C-clips or the like (not shown) as is well known in the art.

The container 12 is then loaded with a load L, as shown in FIG. 1 and the user of the apparatus is able to grasp the two handles 16 of the wheel barrow 10 and push the wheel barrow 10 supported on the frame 20 which is rotatably supported by the wheel 14 and the casters 56 and 58. When the wheel barrow 10 and adapter apparatus 18 are to be parked or braked, the lever 72 is raised, as shown in FIG. 4, thus raising the casters 56 and 58 relative to the frame 20 so that the container 12 contacts the ground thus preventing movement of the wheel barrow 10 and adapter apparatus 18.

Furthermore, the tongue 90 is able to be connected to a tow bar of a lawn tractor or the like (not shown), so that the wheel barrow 10 and adapter apparatus 18 can be towed behind the lawn tractor.

Figure 5:
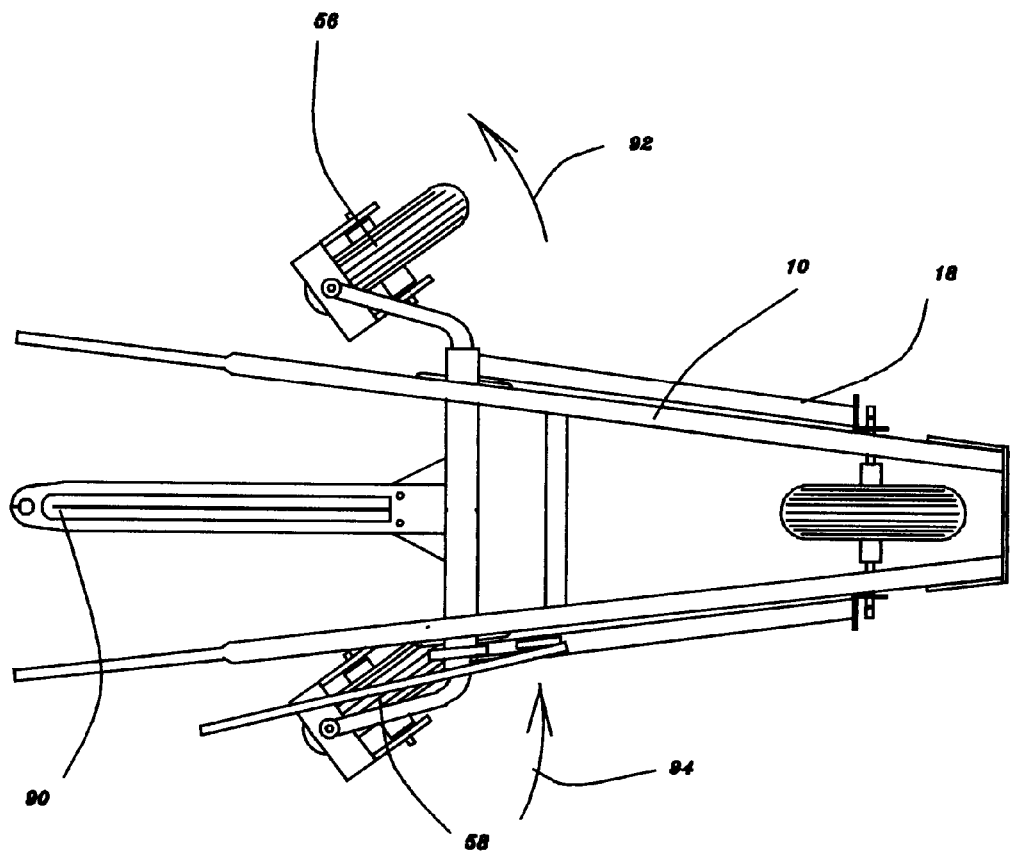
FIG. 5 is a top plan view of the apparatus shown in FIG. 3.

FIG. 5 is a top plan view of the apparatus shown in FIG. 3 As shown in FIG. 5, when the adapter apparatus 18 is being towed, the casters 56 and 58 swivel as indicated by arrows 92 and 94 so that the wheel barrow 10 and adapter apparatus 18 follow the tractor and permit the wheel barrow 10 and adapter apparatus 18 to follow the tractor through a turn thereof.

Figure 6:
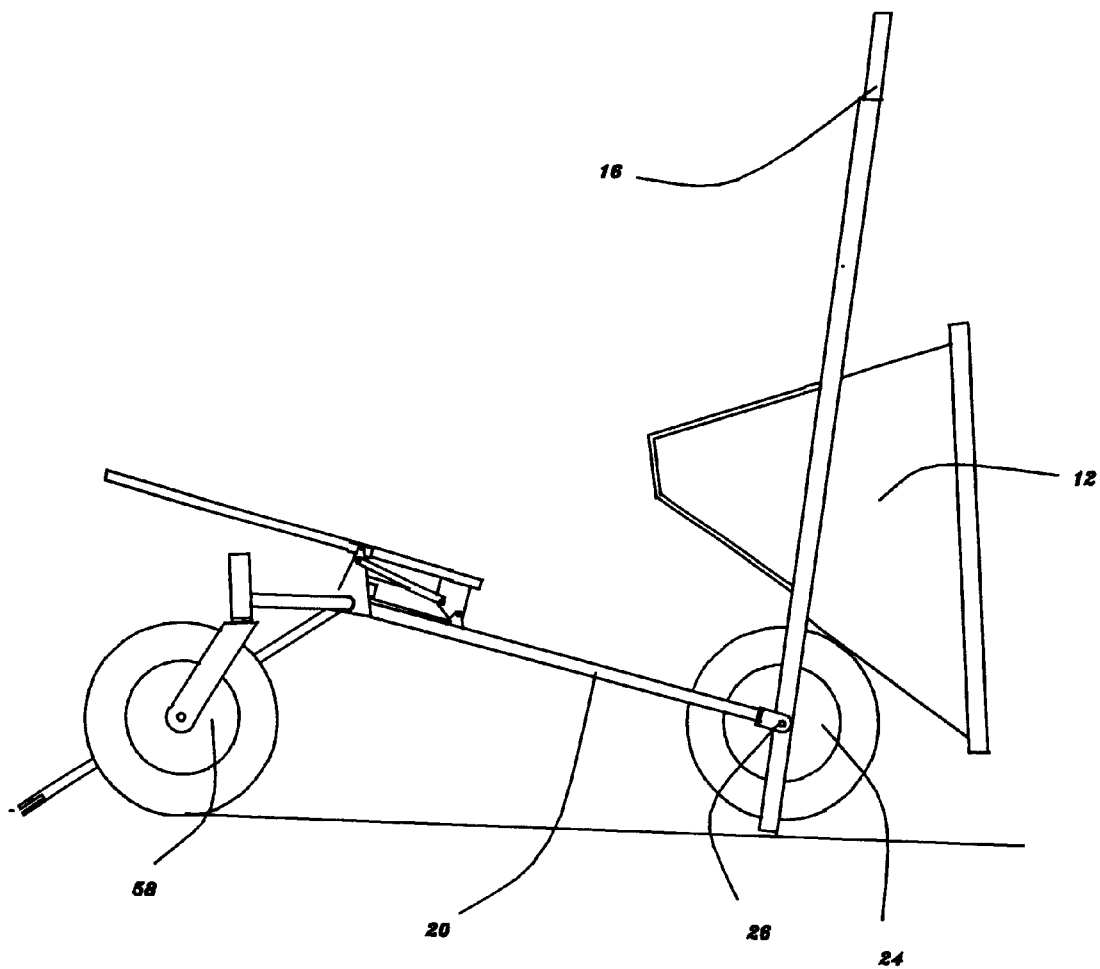
FIG. 6 is a similar view to that shown in FIG. 3 but with the handle and container pivoted about the axle for unloading the container.

FIG. 6 is a similar view to that shown in FIG. 3 but with the handle 16 and container 12 pivoted about axle 26 in order to unload the load from the container 12.

The present invention provides a unique arrangement for assisting easy transportation of a loaded wheel barrow.

What is claimed is:

1. An adapter apparatus for assisting transportation of a wheelbarrow, the wheelbarrow including a pair of elongated handle members, a load carrying container disposed between the pair of handle members and attached thereto, and a front wheel rotatably supported by an axle extending through forward ends of the pair of handle members, the adapter apparatus comprising:

a frame including a pair of side members;

an adapter axle having first and second ends, said adapter axle being configured to extend through said forward ends of said pair of handle members and said front wheel after said axle of said wheelbarrow has been removed, and forward ends of said pair of side members of said frame being pivotally connected to said first and second ends of said adapter axle for permitting pivotal movement of said pair of handle members and said container relative to said frame; and a pair of rear wheels rotatably secured to a rearward end of said frame so that the container is disposed between said elongated axle and said pair of wheels, wherein in a first mode of operation of said adapter apparatus, the pair of handle members are supported by said frame and is transported on the front wheel and the pair of rear wheels for transportation of the load disposed within the container, and in a second mode of operation of said adapter apparatus, the pair of handle members are lifted relative to said frame such that the pair of handle members and the container are pivoted about said adapter axle for unloading a load from the container.

2. An adapter apparatus as set forth in claim 1 wherein said pair of rear wheels includes:

a first caster secured to said frame and disposed remote from the front wheel;

a second caster secured to said frame and disposed remote from the front wheel, such that said frame is disposed between said casters;

a caster support extending through and rotatably supported by a transverse casing, said caster support having a first and a second end so that said first end of said caster support supports said first caster and said second end of said caster support supports said second caster.

3. An adapter apparatus as set forth in claim 2 wherein said first end of said caster support includes:

a first rotatable coupling for coupling said first caster to said caster support;

said second end of said caster support including:

a second rotatable coupling for coupling said second caster to said caster support.

4. An adapter apparatus as set forth in claim 2 further including:

a height adjusting device secured to said frame for adjusting said casters relative to said frame so that in a first disposition of said height adjusting device, the container is supported for transportation thereof and when said height adjusting device is disposed in a second disposition thereof, the container is lowered so that transportation thereof is inhibited.

5. An adapter apparatus as set forth in claim 4 wherein said height adjusting device includes:

a lever having a proximal and a distal end, said proximal end being pivotally connected to said frame;

a link having a first and a second extremity, said first extremity of said link being pivotally secured to said lever between said proximal and distal end thereof;

an arm rigidly secured to said caster support, said second extremity of said link being pivotally secured to said arm such that when said lever is disposed in a first location thereof, said link pivots said arm so that said caster support rotates for moving said casters to a lowered disposition thereof, and when said lever is disposed in a second location thereof, said link pivots said arm so that said caster support rotates for moving said casters to a raised disposition thereof.

6. An adapter apparatus as set forth in claim 1 further including:

a tongue secured to said frame so that towing of said adapter apparatus and the wheel barrow is permitted.

7. An adapter apparatus for assisting transportation of a wheelbarrow, the wheelbarrow including a pair of elongated handle members, a load carrying container disposed between the pair of handle members and attached thereto, and a front wheel rotatably supported by an axle extending through forward ends of the pair of handle members, the adapter apparatus comprising:

a frame including a pair of side members;

an adapter axle having first and second ends, said adapter axle being configured to extend through said forward ends of said pair of handle members and said front wheel after said axle of said wheelbarrow has been removed, and forward ends of said pair of side members of said frame being pivotally connected to said first and second ends of said adapter axle for permitting pivotal movement of said pair of handle members and said container relative to said frame;

a pair of rear wheels rotatably secured to a rearward end of said frame so that the container is disposed between said elongated axle and said pair of wheels; and a height adjusting device secured to said frame for adjusting a position of said pair of rear wheels relative to said frame so that in a first disposition of said height adjusting device, the container is in an elevated position for permitting transportation of said wheelbarrow and when said height adjusting device is disposed in a second disposition, the container is in a lowered ground engaging position so that transportation of said wheelbarrow is inhibited, wherein in a first mode of operation of said adapter apparatus, the pair of handle members are supported by said frame and is transported on the front wheel and the pair of rear wheels for transportation of the load disposed within the container, and in a second mode of operation of said adapter apparatus, the pair of handle members are lifted relative to said frame such that the pair of handle members and the container are pivoted about said adapter axle for unloading a load from the container.

* * * * *